(No Model.)

T. S. HEATH.
SINGLE WHEEL SULKY AND DEVICE FOR ATTACHING HORSES THERETO.

No. 605,099. Patented June 7, 1898.

Witnesses:
Inventor:
Thomas S. Heath
Attorney

United States Patent Office.

THOMAS S. HEATH, OF CROSS TIMBERS, MISSOURI.

SINGLE-WHEEL SULKY AND DEVICE FOR ATTACHING HORSES THERETO.

SPECIFICATION forming part of Letters Patent No. 605,099, dated June 7, 1898.

Application filed September 28, 1897. Serial No. 653,335. (No model.)

*To all whom it may concern:*

Be it known that I, THOMAS S. HEATH, a citizen of the United States, residing at Cross Timbers, in the county of Hickory and State of Missouri, have invented a certain new and useful Improvement in Single-Wheel Sulkies and Devices for Attaching said Vehicle to a Horse, of which the following is a specification.

My invention relates to a new and useful improvement in single-wheel sulkies and device for attaching said vehicle to a horse, and has for its object primarily to improve upon Patent No. 544,918, granted to me by the United States Patent Office, and generally to improve upon the construction of such vehicles and method of attaching the same so as to give to the horse perfect freedom and to the driver perfect control both of the horse and vehicle.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
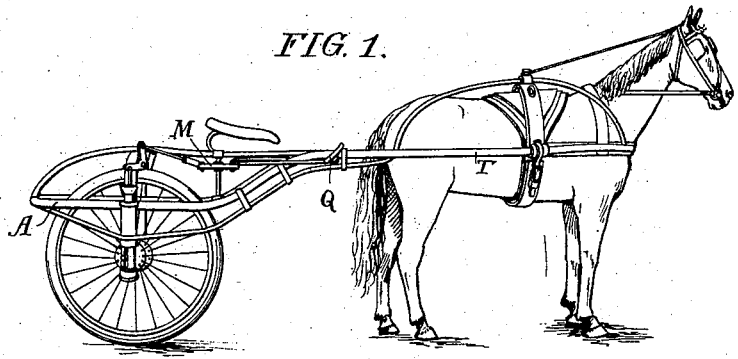
Figure 2:
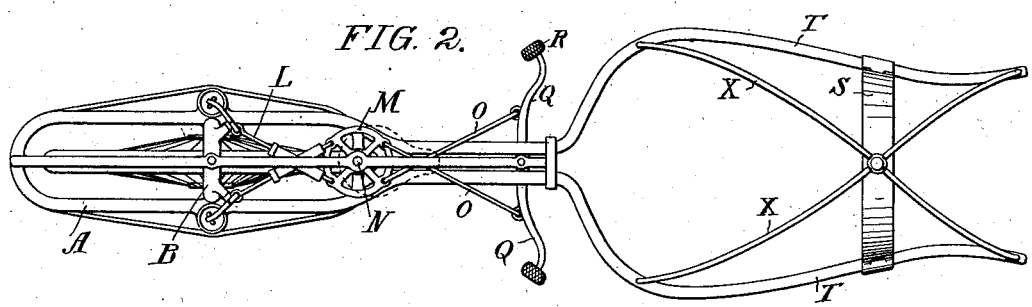
Figure 3:
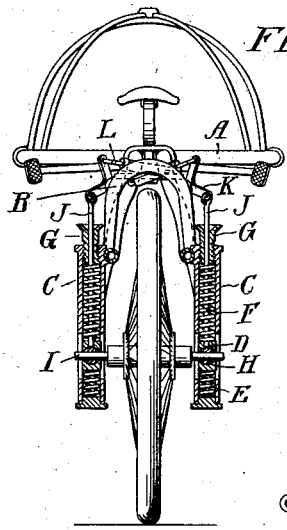
Figure 4:
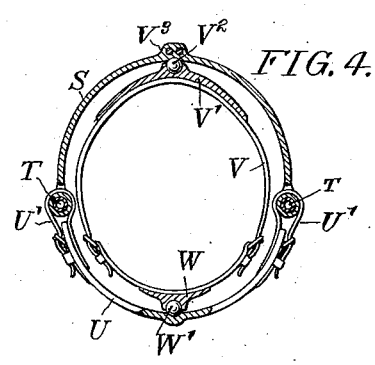

Figure 1 represents my improvement as attached to a horse; Fig. 2, a plan view thereof; Fig. 3, a rear view; Fig. 4, an enlarged section of the attaching arch, saddle, and girth; and Fig. 5, a detail section of one of the telescoping rods used to connect the turn-disk with the bell-crank levers.

In carrying out my invention as here embodied, A represents the frame of the vehicle, which may be of any suitable material or design, having an arch B secured thereto, the lower ends of which carry the tubular housings C. These housings have fitted therein the boxes D, which are mounted upon the springs E, and likewise have the springs F placed thereon, the tension of the last-named springs being made adjustable by the thumbscrew G. Each of the boxes has spherical bearings H fitted therein, through which latter pass the ends of the axle I, said ends also passing through suitable slots in the housings in order to give them a free vertical movement within certain limits. The rods J are secured at their lower ends to the spherical bearings and pass upward through the springs F and screws G, having their upper ends connected to the bell-crank levers K. The opposite members of the bell-crank levers are connected by means of the rods L to the turn-disk M, which is pivoted at N to the vehicle, and this disk is in turn connected by the rods O to the foot-lever Q, said lever terminating at each end in a foot-rest R, upon which the feet of the rider are placed when the vehicle is in use.

Figure 5:
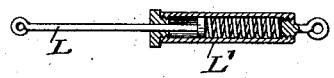

The rods L are telescoped, as clearly shown in Fig. 5, by one section thereof passing within a tube carried by the opposite section, said tube containing therein a spiral spring L' and so arranged as to normally tend to force these sections apart. Since both of the rods L are connected to the turn-disk and the bell-crank levers this action will be balanced. This arrangement is an important feature of my device, as it is essential to the working of the machine, for the reason that the springs in the housings when compressed cause the piston or rods J to rise up, and thus bring great strain upon the rods L, so that the latter must of necessity shorten.

As is obvious from the above description, the position of the axle I relative to the vehicle may be changed by increasing the pressure upon one side or the other of the foot-lever Q, and this change of position will facilitate the vehicle in passing around curves, as will be readily understood.

One of the important features of my present invention is the principle embodied in the hitching or device for attaching the vehicle to the horse, and this consists in providing an arch S, which is rigidly secured to the thills T of the vehicle and is of sufficient dimensions to span the horse without coming in contact therewith.

An arch U is detachably attached to the thills in any convenient way, here shown by means of the straps and buckles U', and these two arches form substantially an oval space through which the body of the horse may pass without coming in contact therewith or with the thills, and the attachment of the horse to these arches is accomplished by first placing the girth V around the body of the horse and securing the same by straps or buckles or otherwise, the girth being secured to a saddle or pad V', in which is fitted a ball V², said ball fitted against and in a socket formed in the upper portion of the arch S, as indicated at V³. The lower portion of the girth has secured thereto the lug W, in which is seated the ball W', the latter bearing against and fitting in a socket formed in the arch U, and these two points of contact and this arrangement will permit the girth to freely swing from side to side within the arches, so that free movement of the horse's body will be accommodated without either hampering his movements or jarring the vehicle from side to side.

The upper arch S may be braced by the stay-rods X, which are attached to the thills, thus rendering this portion of the device exceedingly rigid and not materially increasing its weight.

In practice it has been found that by the use of my improvement a horse of given speed when hitched to an ordinary vehicle is enabled to decrease the time of traveling a given distance by several seconds.

Having thus fully described my invention, what I claim as new and useful is—

1. The herein-described combination of a vehicle-frame, a single wheel upon which said frame is mounted, means for varying the relative position of said wheel to the frame, two arches attached to the thills, a girth secured upon the horse, and ball-bearings connecting said girth and arches, as specified.

2. In combination with a vehicle of the character described, an upperly-curved arch attached to the thills, a corresponding arch extending downward also attached to the thills, a girth adapted to be secured around the body of a horse, a saddle carried by said girth, balls also carried by the girth and fitted to the arches so as to form swiveled points, and means for staying the upper arch, as specified.

3. In combination, a vehicle-frame, housings projecting downward therefrom, boxes fitted to slide within said housings, springs arranged above and below the boxes, an axle adapted to revolve within the boxes, a single wheel secured to the axle, rods connected to the boxes, bell-crank levers to which said rods are attached, a turn-disk pivoted to the frame of the vehicle, rods for connecting said turn-disk with the bell-crank levers, and a foot-lever connected by rods to the turn-disk, whereby the position of the axle relative to the vehicle-frame may be varied, as specified.

4. In combination with a vehicle of the character described, a turn disk or lever, a bell-crank lever, rods for connecting the first-named member to said bell-crank lever, each of said rods being made in two sections having a spring interposed therebetween, substantially as and for the purpose set forth.

In testimony whereof I have hereunto affixed my signature in the presence of two subscribing witnesses.

THOMAS S. HEATH.

Witnesses:
C. E. BARNETT,
JOHN SPICKERT.